A. H. WOODWARD.
FARE COLLECTING AND REGISTERING MEANS.
APPLICATION FILED FEB. 5, 1917.
1,344,842.
Patented June 29, 1920.
5 SHEETS—SHEET 1.
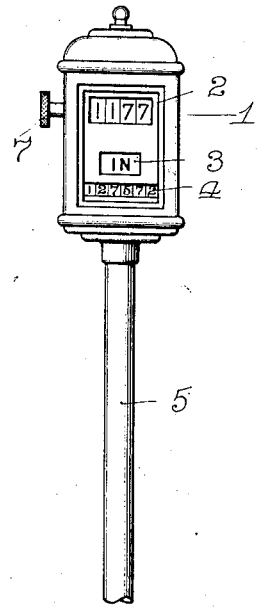
Fig. 1
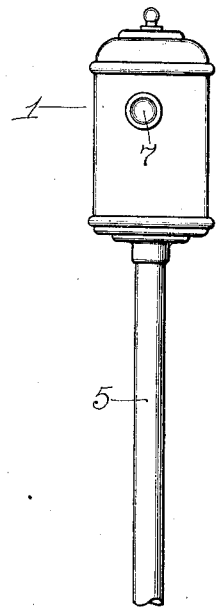
Fig. 2
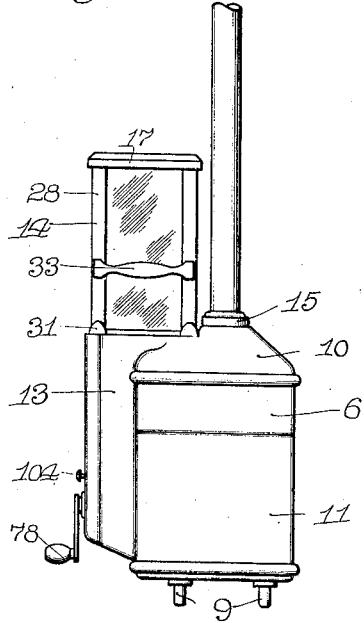
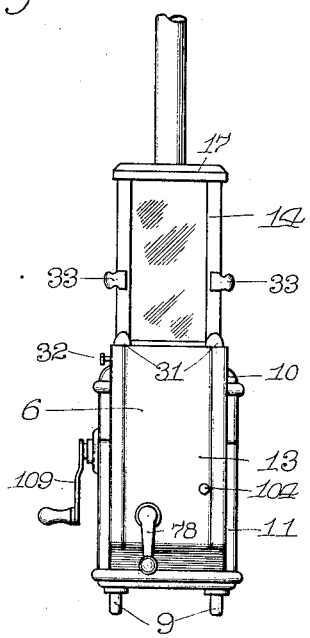
Inventor
Arthur H. Woodward
By Brown, Hanson & Boettcher
Attorneys A. H. WOODWARD.
FARE COLLECTING AND REGISTERING MEANS.
APPLICATION FILED FEB. 5, 1917.

1,344,842.

Patented June 29, 1920.
5 SHEETS—SHEET 2.

Inventor:
Arthur H. Woodward
By Brown, Hanson & Boettcher
Attorneys

A. H. WOODWARD.
FARE COLLECTING AND REGISTERING MEANS.
APPLICATION FILED FEB. 5, 1917.

1,344,842.

Patented June 29, 1920.
5 SHEETS—SHEET 4.

Inventor
Arthur H. Woodward
By Brown, Hanson & Boettcher
Attorneys

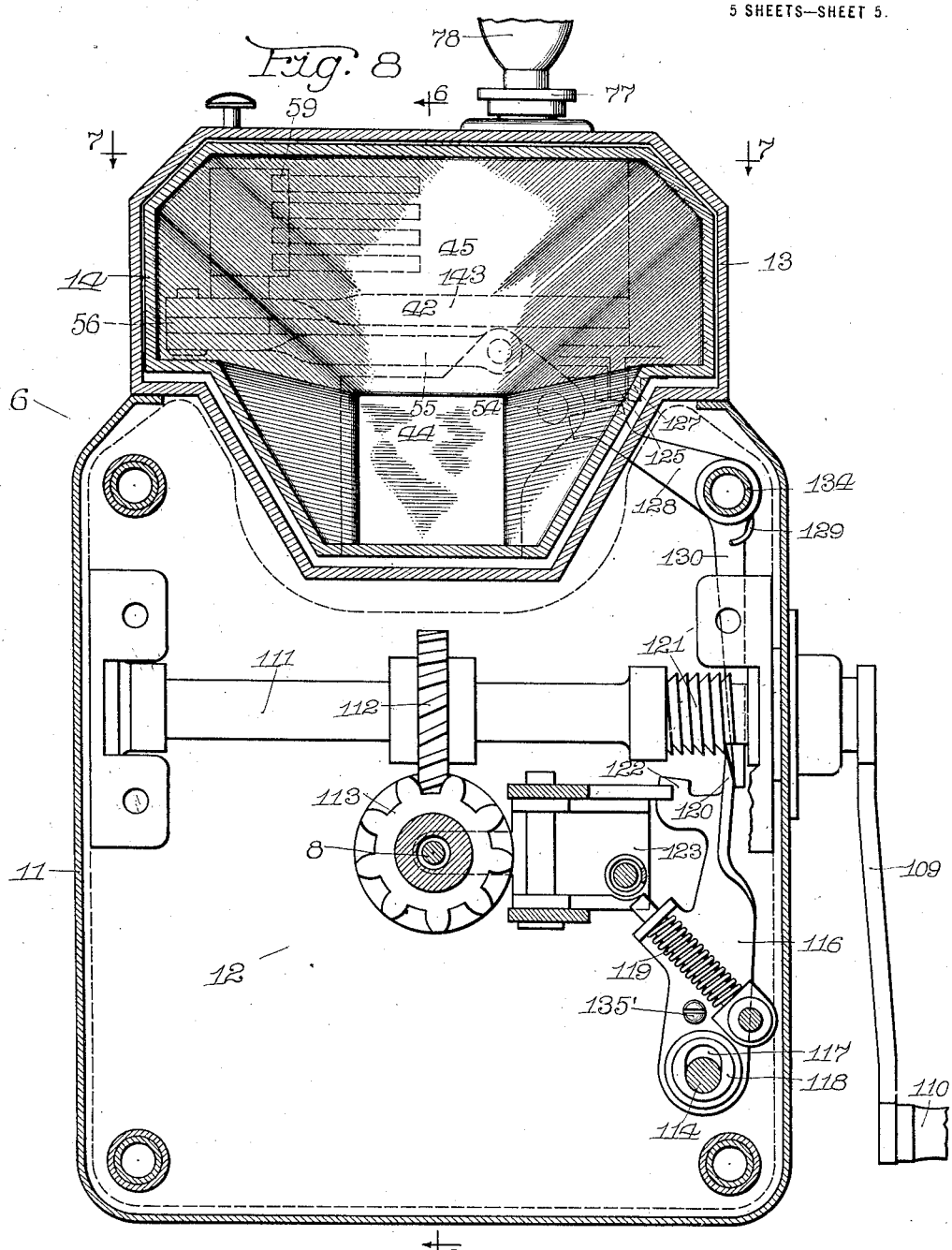

UNITED STATES PATENT OFFICE.

ARTHUR H. WOODWARD, OF ALTADENA, CALIFORNIA, ASSIGNOR, BY MESNE ASSIGNMENTS, TO JOHNSON FARE BOX COMPANY, OF CHICAGO, ILLINOIS, A CORPORATION OF NEW YORK.

FARE COLLECTING AND REGISTERING MEANS.

1,344,842.  Specification of Letters Patent.  Patented June 29, 1920.

Application filed February 5, 1917. Serial No. 146,555.

*To all whom it may concern:*

Be it known that I, ARTHUR H. WOODWARD, a citizen of the United States, residing at Altadena, in the county of Los Angeles and State of California, have invented certain new and useful Improvements in Fare-Collecting and Registering Means, of which the following is a full, clear, concise, and exact description, reference being had to the accompanying drawings, forming a part of this specification.

My invention relates to fare collecting and registering means. This invention has been conceived as a solution of the problem of collecting fares from the passengers of a system of transportation employing the zone system of fares or tariffs. While the invention is particularly described and illustrated with reference to an embodiment adapted to and employed for use in collecting fares for transportation, it is to be understood that the invention may be employed for other purposes, as will be apparent from the following.

The term "zone system" of fares in transportation means a system of fares or tariffs in which trips within a given zone may be made for a uniform fare but trips passing beyond one zone require the payment of additional fares in accordance with a predetermined schedule.

The problem of collecting fares for transportation in a street-car system has become in cities of large size and population highly complex. In a small town or city no great difficulty is usually encountered as the territorial extent of the system is small, the population is not great and the density of population is relatively low. A uniform charge may be made for a trip anywhere within the system.

In large cities of a great number of inhabitants and of large territorial extent the problem is far more difficult. Transfers from one line to another also complicate the situation greatly. Collection is further complicated by the greater density of population and by the consequently great and sharp demands for transportation at rush hours such as occur in business districts of all large cities. Checking of receipts under such circumstances is so difficult and so ineffective that large losses to the operating company occur. Usually the territorial limits of a system of transportation for a large city extend far beyond the limits of a city and it is necessary in order to make up a proper revenue for the system to charge additional fares for passengers going beyond certain fixed limits, particularly the limits of the city or municipality. Hence the collection of an additional fare from each passenger going outside of a given zone is required.

The object of the present invention is to provide a collecting and registering means for fares in a transportation system particularly such a system as employs a zone system of fares or tariffs.

In my co-pending application, Serial No. 808,381, filed December 23rd, 1913, I have shown and described a fare-collecting and registering mechanism which has been very successful in registering and collecting fares on the pay-as-you-enter principle from the patrons as they enter the car or other inclosure. That device is not adapted to collect fares at zone points, as the patrons are then in the car or inclosure and are seated and should not be unnecessarily disturbed.

The present invention is an improvement on the device of that application to adapt the same to use on the pay-as-you-enter principle and also for collecting and registering fares at zone points. I accomplish this desirable result by providing a detachable hopper which when in position on the machine serves as the usual hopper, and which when detached from the rest of the machine may be carried about by the conductor in order to permit the passengers in the car to deposit their fares.

In order to make such operation feasible, I have provided inter-related means upon the hopper-receptacle and the main body of the counting and registering device for locking the hopper receptacle when it is detached from the counting and registering mechanism and for unlocking the hopper receptacle when it is placed back on the counting and registering device. I have also provided interlocking controls for preventing improper operation of this device.

In the accompanying drawings,

Figure 1 is a front elevation of the complete fare-collecting and registering mechanism;

Fig. 2 is a side elevation of the same;

Fig. 8 is a section in a horizontal plane taken substantially on the line 8, 8, of Fig. 6.

Figure 4:
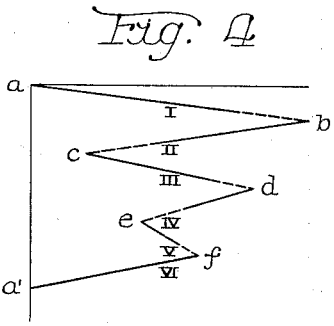
Fig. 4 is a diagram of the operation of the combination lock.

In order to make my invention feasible in practice I have found it necessary to develop a novel locking and lock-controlling mechanism for governing the use of the hopper receptacle. The hopper receptacle is provided with an outlet passageway which is normally closed and locked by means of a combination lock capable of a great number of permutations. The hopper receptacle fits into a socket which is provided upon the base of the counting and registering mechanism, this socket being provided with a chute in alinement with the opening in the bottom of the hopper receptacle and adapted to receive the coins collected in said hopper receptacle when the door or closure of the hopper receptacle is opened by unlocking the lock. I also provide a combination setting mechanism for setting the combination of the lock and thereby unlocking the receptacle, this mechanism being located within the base of the machine in such a position as to be substantially incapable of observation by the operator of the machine. I have also provided suitable interlocks between the various parts of the mechanism to insure that the hopper will not be removed before all of the coins deposited in the hopper receptacle have been registered and to insure that the hopper will be closed and locked before the same can be removed from the socket.

As is indicated in the general views of Figs. 1 and 2, the device of the present invention comprises an overhead register or indicator 1 having a suitable sight opening 2 at which is displayed the number of fares collected on the particular trip, another sight opening 3 indicating the direction of the trip and a further sight opening 4 indicating the total registration. The overhead register or indicator 1 is mounted upon the top of the column 5 which rises from the upper end of the base 6, this base comprising a suitable housing inclosing suitable coin gaging and counting mechanism which is connected to the overhead register for registering the number of tokens or coins received as fares. This mechanism is described in detail in my said co-pending application and only such parts as enter into novel combination are herein described in detail. The overhead register 1 is provided with a resetting knob 7 which as explained in the said application controls the resetting of the trip indicator 2 and of the direction indicator at 3. The resetting mechanism is connected by an interlocking rod 8 (see Fig. 8) to suitable interlocking connections as will be described later for preventing improper operation of the device. The base 6 is provided with suitable supporting legs 9 and an inclosing casing formed of the upper portion 10 and a lower portion 11 which surround the coin-feeding, gaging and counting mechanism referred to broadly by the reference character 12 and contained within the shell of the base 6. An auxiliary housing 13 incloses the unlocking or combination setting mechanism above referred to. This housing also provides a socket for the detachable hopper receptacle 14 which is individually illustrated in Fig. 3.

Access to the interior of the base 6 can be gained only by release of the collar 15, this collar connecting the housing of the base 6 to the column 5 and covering the joint between the column 5 and the supporting mechanism of the coin counting mechanism 12. The collar 15 is provided with a ratchet 16 which is engaged by a suitable pawl, not shown, contained within the upper part of the housing 6 and which pawl can be released only through a small opening that is normally covered with a glass seal, hence the only manner in which access can be gained to the coin counting mechanism and to the unlocking or combination setting mechanism is through breaking the glass seal indicated.

The hopper 14 comprises an open hopper top 17 which is supported by suitable pillars or posts 18 from the hopper bottom 19. The hopper bottom 19 has an opening 20 therethrough, this opening being normally closed by the trap doors 21 and 22. The trap doors 21 and 22 are pivoted at 23 and 24, respectively, in lugs struck up from the hopper bottom 19. These trap doors are connected together by a link or connecting rod 25 so as to be opened in unison. The trap door 21 is pivoted to the link 25 with a longer radius arm than the trap door 22 so that the trap door 22 opens further than the trap door 21 so as to secure quicker opening and better closing. The side walls of the hopper are formed of glass plates 26 which rest against rubber gaskets 27 on the columns or posts 18. These plates of glass 26 are held in place by straps or channels 28 which extend from underneath the flange 29 of the hopper top 17 down to the hopper bottom 19. An inclosing casing 30 is secured to the hopper bottom and is secured to the side straps 18. The base 30 is provided with projecting ears 31 for supporting the channels 28. The shaft 23 upon which the trap-door 21 is mounted projects through the casing 30 and is connected to an operating handle 32 for operating the trap doors 21 and 22. A pair of handles 33 are connected to the channel members 28 upon opposite sides of the hopper receptacle to enable the collector to carry the hopper about. Within the hopper a zig-zag glass inspecting chute 34 is mounted immediately below the hopper top 17 and is connected thereto by the sheet metal connecting member 35 which engages the bead 37 about the upper edge of the chute. A detecting comb 38 is mounted adjacent the glass walls 26 about the upper end of the hopper, this detecting comb having spring fingers 39 adapted to engage and to hold any coin which drops between the comb and the glass in case the hopper receptable is inverted. The lower end of the glass chute 34 is closed by a trap door 40 which is held normally closed by a small spring, the trap door 40 being mounted by means of a band 41 which embraces the periphery of the bottom of the chute.

Below the trap doors 21 and 22 the casing 30 forms a receptacle 42 having sloping walls leading to a discharge opening 43 which is normally closed by a door 44 which is pivoted to swing edgewise across the opening 43. Below the sloping wall 45 of the receptacle 42 (see Fig. 6) the casing 30 forms a depending housing 46 within which is contained a suitable combination lock 47 governing the opening of the door 44.

Below the extension 46 of the casing 30 is a further extension 48 which houses a gear-wheel 49 that is mounted on a short transverse shaft 50 having bearings in the casing 48 upon each side thereof. The casing 13 provides a suitable socket for receiving the lower end of the hopper receptacle. Below the wall 51 is provided a space which houses the combination setting mechanism 52 which will be described later in detail. The space which incloses the combination setting mechanism is closed off by an inner wall 53 as the combination setting mechanism has no direct connection with the coin-gaging, counting and registering mechanism.

I am aware that numerous lock-box receptacles have been provided and my invention does not cover this broadly but I believe is the first to provide a lock-box or receptacle with a combination lock capable of a great number of permutations in connection with means for setting up the combination, this means being operated by a simple manual movement, such as the turn of a crank, or the like. According to my invention, if by any mischance the combination of a locked-box or receptacle should be discovered the combination of the lock and the combination of the corresponding setting mechanism can be re-set with very little difficulty. No master key can be devised and the difficulty of setting up the combination is so great and so much time would be required to pick the combination, even if it could be done, that a very high degree of security is afforded. The door 44 is hinged at 54 and is operated by a link 55 which is connected at one end to the door 44 and is connected at its rear end to an arm 56 mounted on a rock-shaft 57. A spring 58 normally tends to rock the shaft 57 in such a direction as to open the swinging door 44 but such operation is prevented by the dog 59 which rides upon the peripheries of the combination wheels 61, 62, 63 and 64. Each of the combination wheels is provided with a slot 65, the lock being so organized as to permit the dog 59 to drop into the slots 65 when the same are all brought into alinement. When the combination wheels are all lined up the spring 58 pushes the nose of the dog 59 down into the slots 65 so that the same are all tied together for a common movement. The combination wheels are mounted upon a shaft 66 and each wheel is provided with pins 67 and the last wheel or disk 64 is connected to a pinion 68 also mounted on the shaft 66.

The combination setting mechanism 52 comprises a cam-shaft 69 upon which are mounted a plurality of cam members 71, 72, 73, 74, 75 and 76. This cam-shaft 69 is adapted to be operated by means of a crank 77 and a handle 78. A square shaft 79 is mounted in the casing 53 parallel to the cam-shaft 69. This square shaft 79 carries a plurality of tappet arms 81, 82, 83, 84, 85 and 86 which have upon the ends thereof rollers 87 for engaging respectively the cams 71 to 76, inclusive.

Figure 5:
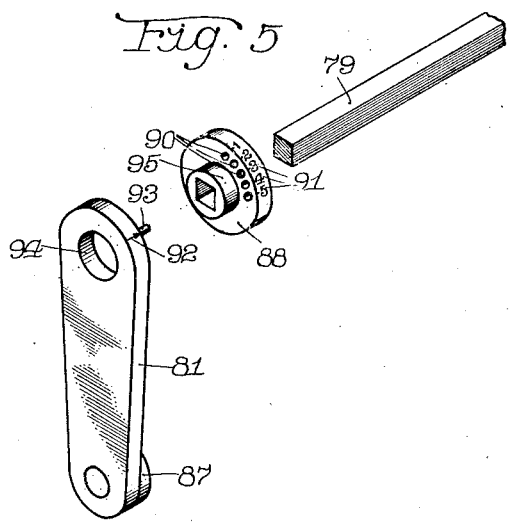
Fig. 5 is an isometric detail view, showing the manner in which the cam arms are connected to the square shaft.

The tappet arms 81 to 86 inclusive are mounted upon hubs 88 with respect to which they are adjustable to form the necessary combinations. In Fig. 5 I have illustrated one manner in which these permutations may be accomplished. The hub member 88 has a plurality of sockets or holes formed therein, as shown at 90, these sockets being suitably numbered by indicia, as shown at 91. The tappet arm 81 is provided with a gage point at 92 and a pin 93 for coöperating with the sockets 90 in order to set the arm 81 at different angular positions with respect to the shaft 79. I have shown five sockets 90 so that the arm is capable of assuming five different positions, but it is to be understood that the number of positions may be very greatly increased, where a large number of permutations and combinations are desired. The arm 81 has a central aperture 94 which is large enough to embrace the boss 95 of the hub 88 so that the side of the arm is flush with the side of the boss. Any other suitable way of securing the necessary changes in angular position may be provided, the manner that I have shown being merely illustrative.

A gear sector 96 is secured to the shaft 79 and it meshes with a pinion 97 mounted upon a shaft 98 having bearings in the casing 13 bringing this shaft axially into alinement with the short shaft 50. The short shaft 50 has an enlarged portion 99 which serves as a clutch member in connection with the coöperating clutch member 100 mounted on the shaft 98 and adapted to be thrown into engagement with the clutch member 99 by a spring 101. The clutch member 100 carries a pin 102, shown in dotted line in Fig. 6, which is adapted to fit in a corresponding socket in the clutch member 99 so that these two members can be connected at only one angular position with respect to each other. A disengaging fork 103 extends into an annular groove in the clutch member 100 and is connected to a push button 104 upon the outside of the casing 13 so that when it is desired to remove the hopper receptacle 14 the coöperating clutch members 99 and 100 may be disengaged.

Fig. 4 is a diagram which I have added for the sake of making clear the operation of the combination lock and the combination setting mechanism for the lock. The function of the combination setting mechanism is to unlock the receptacle at the base of the hopper so that when the hopper receptacle is placed in the socket, a turn of the handle 78 will unlock the hopper receptacle so that the coins which are contained therein may be discharged into the gaging, counting and registering mechanism to be registered. A combination lock is not as easily picked as is the ordinary pin-tumbler lock and the peculiar inclosed nature of the combination lock in this instance makes it very difficult to learn the combination. The combination setting mechanism 52 rotates the shaft 50 back and forth a predetermined distance in each case sufficient to set up the combination wheels 61 to 64 and thus unlock the receptacle. The cam-arms 71 to 76, inclusive, are fixed with respect to each other but the setting of the arms 81 to 86 is varied in accordance with the setting of the combination wheels 61 to 64.

In the operation of setting up the combination wheels, motion is first transmitted to the sector 96, the pinion 97 and the gears 49 and 68 in amount sufficient to turn the first combination wheel 64 through substantially five turns or to any predetermined value between four and five turns, such as to bring the corresponding slot 65 in wheel 61 into register with the end of the dog 59. This is shown on the diagram of Fig. 4 as the distance between the points $a$ and $b$. The combination wheel 61 is then set up into proper position and thereafter sufficient angular motion is transmitted to the sector and gear wheels in the opposite direction as is shown by the line $b$, $c$, to bring the slots 65 in the combination wheel 62 into register. The motion required to accomplish this is less than four and greater than three turns of the pinion 68. The combination wheel 63 is then set up by a motion in reverse direction as is indicated by the line $c$, $d$, this amount of motion being less than three and greater than two turns of the pinion 68. Finally the wheel 64 is properly set by motion in the reverse direction as indicated by the line $d$, $e$, the amount of motion being greater than one and less than two turns of the pinion 68. The combination wheels 61 to 64 being now set up the nose of the dog or pawl 59 drops into the alined slots 65 under the influence of the spring 58, and motion is then transmitted to the pinion 68 as is indicated by the line $e$, $f$, on Fig. 4, whereby all of the combination wheels and the shaft 59 are moved in common to an extent sufficient to open the door 44. At the point $f$, the trap-door 44 is opened and the coins in the receptacle 42 are free to pass down into the coin counting mechanism. The handle 77, 78 is stopped when the door is thus opened and, as will be described later, the hopper receptacle is locked into its socket at this time so that the hopper may not be removed with the door open.

After the fares are counted and the conductor desires to remove the hopper for collection through the car the handle 78 is moved forward a distance represented by the line $f$, $a'$, this distance being substantially greater than one turn of the pinion to demolish or disorganize the setting of the combination wheels. The six distinct movements which are required are obtained by means of the cams 71 to 76, inclusive, and the tappet arms 81 to 86, inclusive, this motion being transmitted through the rocking shaft 79, the shaft 98 and through the gears 49 and 68 to the first wheel 64 of the combination and through the medium of the pins 67 upon each of the combination wheels the motion is properly transmitted to these wheels to set them up and after the combination is set the dog or pawl 59 locks all of the combination wheels together long enough to open the door 44 and the final movement disarranges the combination.

The coin pan 105 which receives the coin from the receptacle 42 is provided with a cover 106 and a chute 107 which opens directly below the door 44 and conducts the coins or fares from the receptacle 42 into the coin pan 105. Coins or tokens are fed from the pan 105 to the gaging and counting mechanism which is not shown, from whence the same are discharged to a chute, not shown, where they are collected by the attendant. The feeding, gaging, counting and registering mechanism is driven by the crank 109 having a suitable handle 110 for manual operation. The crank 109 is connected to the main driving shaft 111 and motion is transmitted through the skew-gears 112, 113, to the various operating parts, not shown.

Figure 6:
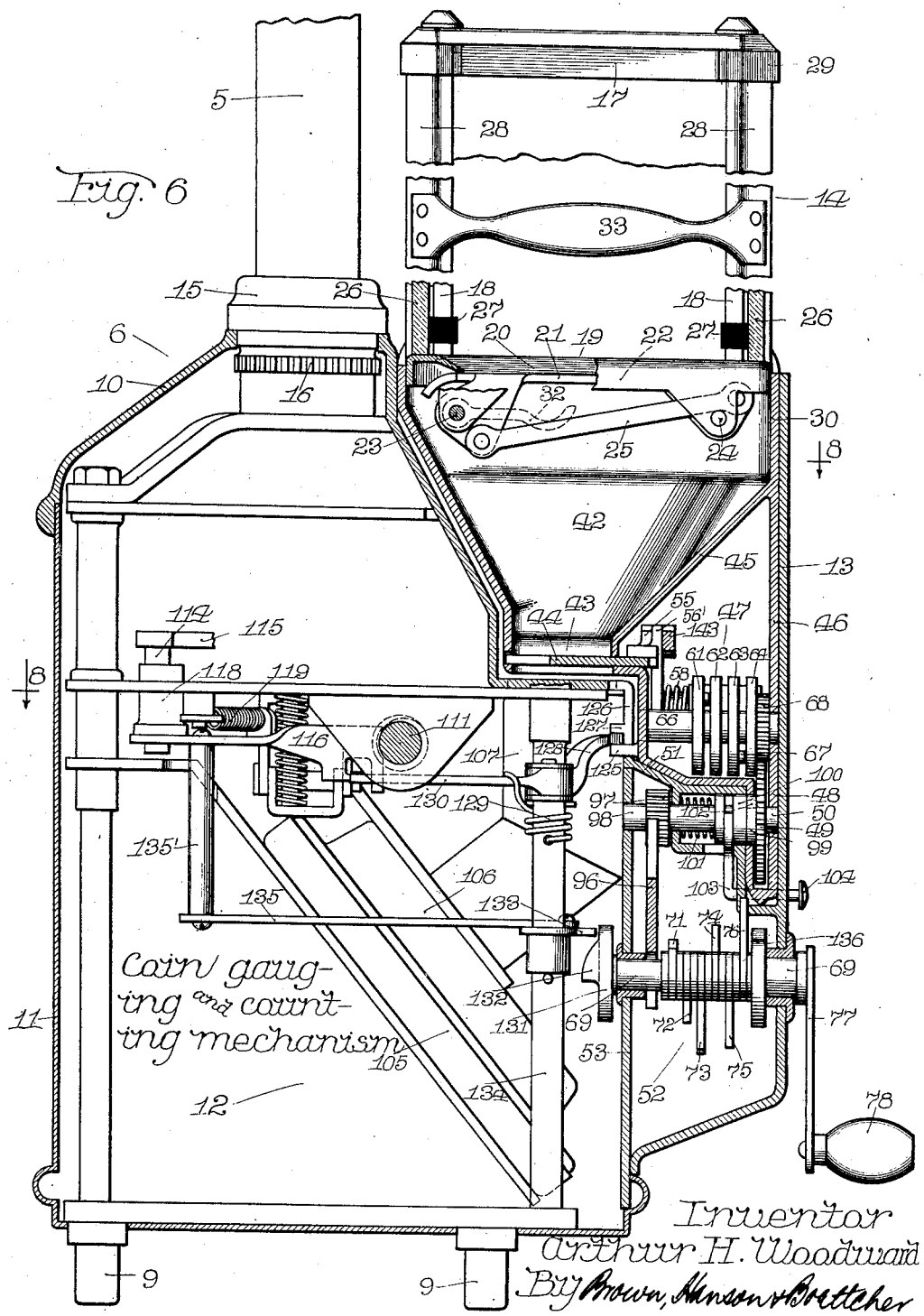
Fig. 6 is a vertical cross-section through the device on the line 6, 6, of Fig. 8.

The main driving shaft 111 is adapted to be connected by a differential clutch, not shown, to the driving shaft of the overhead register, this clutch being controlled by the coins passing through the gaging and counting mechanism to impart the proper amount of movement to the register operating shaft in accordance with the value of the coins registered. A pin 114 is mounted upon an arm 115, this arm and pin being moved to the left, as shown in Fig. 6, each time that a coin is registered. An interlocking pawl 116 is controlled by the pin 114 which plays in a slot 117 in the hub 118, formed on the outer end of the interlocking pawl 116. A spring 119 pushes the pawl 116 diagonally forward and to the left, as shown in Fig. 8, tending to make the sharp nose of the pawl 120 move toward the first or innermost one of the ratchet threads 121 on the shaft 111. The interlocking pawl 116 has a projecting tongue 122 which interlocks the locking lever 123 by moving over into alining slots cut in the turned up edge of the lever 123 and in the side member of the supporting bracket member 124. This prevents depressing of the extension 123' shown in dotted lines in Fig. 8 by the interlocking rod 8 and thus prevents the overhead register from being reset until five idle turns of the shaft 111 have been made, after outward movement of the pawl 116. When a coin is registered, or when the door 44 is opened, as will be explained later, the pawl 116 is withdrawn from the ratchet threads 121 and is moved to the left as is shown in Fig. 8, by means of the spring 119, so that the nose of the pawl rests upon the first threads 121 and the projection 122 lies in the path of the locking lever 123, thus preventing downward movement of the rod 8 which is necessary before the register can be reset.

Figure 3:
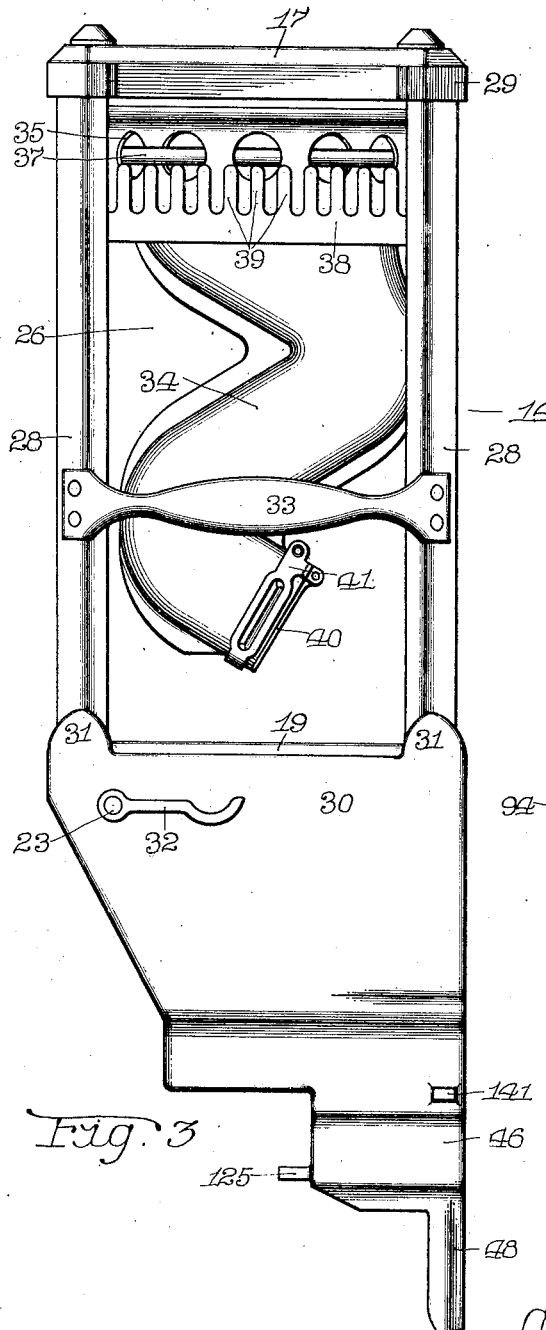
Fig. 3 is a side elevation of the detachable hopper receptacle, shown in Fig. 1.

I provide also an interlock between the hopper receptacle and the socket in which it is to be placed which interlock is controlled by the five turn mechanism just described. For this purpose a projection 125 is formed on the casing 46, as is shown in Fig. 3, and this projection is adapted to drop into a suitable groove 126, as is shown in Fig. 6, and in dotted lines in Fig. 8. A pair of projections 127 are mounted on the inner walls of the socket in such manner as to permit the end of the interlocking lever 128 to drop between the projections 125 and 127 whenever the pawl 116 is retracted from the five-turn thread and thrown backward to its zero position. A spring 129 normally tends to throw the arm 128 into locking position to prevent either the withdrawal or replacing of the hopper receptacle. The interlocking lever 128 is provided with a tail 130 which rests against the end of the pawl 116 under the influence of the spring 129 so that the position of the pawl 116 controls the position of the interlocking lever 128. It can thus be seen that unless five clear turns of the coin-gaging, counting and registering mechanism have been made the hopper receptacle cannot be fully inserted in the socket or withdrawn if it previously has been placed in the socket.

The effect of this interlock is that after the hopper has been inserted and coins therefrom have been registered, it will be impossible to withdraw the hopper receptacle until all of the coins have been registered. In a similar manner it will be impossible for the clutch members 99 and 100 to be put into engagement unless the hopper receptacle is placed fully in the socket and such placing is impossible until the counting mechanism has been cleared.

In order to prevent the hopper receptacle from being placed in the socket and unlocked and the hopper receptacle then withdrawn without the coins being rung up, I have provided an interlock between the combination setting mechanism and the five-turn device which operates to return the pawl 116 to the zero position whenever the combination setting mechanism is operated to unlock the coin receptacle. To this end a cam 131 is mounted on the end of the shaft 69 and is provided with a raised portion 132 which is adapted to engage a short arm or lever 133 pivotally mounted on the adjacent column 134. This arm 133 is connected by a link 135 to the pin 135' which passes through the interlocking pawl 116, (see Fig. 6). Thus each time that the shaft 69 is turned to set the combination wheels 61 to 64, the pawl 116 is disengaged from the threads 121 and is set back to zero at the same time interlocking the resetting mechanism and the hopper receptacle until such time as five free turns have been made of the coin counting mechanism.

I have also provided an interlock between the combination setting mechanism and the hopper receptacle, such that the hopper receptacle can be withdrawn from its socket only when the door 44 has been closed and the combination disarranged or demolished. The cam 136 is mounted upon the cam shaft 69 and is provided with a depressed portion or notch 137. An interlocking lever 130

Figure 7:
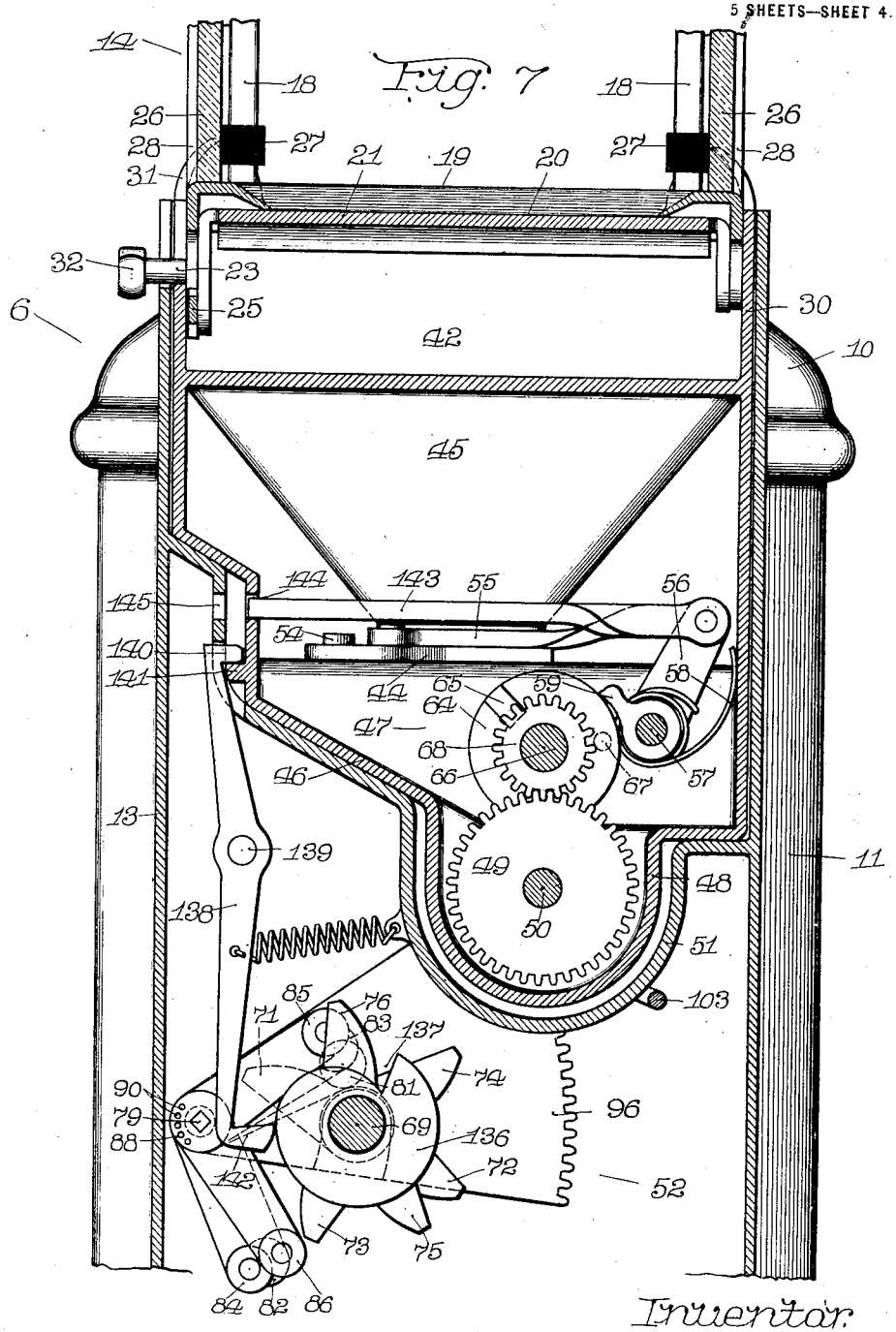
Fig. 7 is a vertical section taken just inside of the hopper walls substantially on the lines 7, 7, of Fig. 8.

138 pivoted at its central portion on a pivot 139 is provided at its upper end with a hook or projection 140 which is adapted to be brought into the path of a projection 141 on the side of the casing 46, see Figs. 3 and 7. The lower end of the lever 138 is provided with a finger 142 resting on the periphery of the cam 136 and being normally held in such position as to place the hook or projection 140 in the path of the lug 141 to prevent the hopper receptacle from being either withdrawn from the socket or placed in the socket until the proper position of the cam is brought about by revolving the cam-shaft 69 to the point where the finger 142 drops into the notch or depressed portion 137. The cam 136 is so placed that the depressed portion 137 permits the finger 142 to drop only at the point $a'$ in the diagram of Fig. 4, that is after a movement has been transmitted to the combination wheel 64 of the proper direction and amount to destroy the combination.

I have provided also a locking bolt 143 connected to the arm 56 which operates the door 44, this locking bolt being adapted to project through an opening 144 in the side walls of the receptacle and to project into a socket 145 in the side walls of the socket for the hopper receptacle so long as the door is open.

It can thus be seen that the hopper receptacle is subject to four conditions or interlocks to safeguard against improper operation. The hopper is locked into position by means of the projection 125 and the arm 128 until all of the coins in the coin pan 105 have been registered, that is to say until five clear turns of the operating shaft 111 have been made. The hopper receptacle is further controlled by the operation of the combination setting mechanism, such that the hopper cannot be withdrawn after the combination setting mechanism has been operated to open the door 44 until five clear turns of the operating shaft 111 have been made. The hopper receptacle is further subject to an interlock with the position of the combination setting mechanism, such that the combination setting mechanism must have passed a point where the door is closed and the combination wheels disarranged before the hopper receptacle can be withdrawn from the socket. A further interlock is provided between the hopper receptacle and its socket, this interlock being under the control of the door 44 so that the hopper receptacle cannot be removed while the door 44 is open.

The general operation of the device is as follows: The device is so placed at the entrance of the car that the incoming passengers can readily drop their cash or metal ticket fares into the hopper 17. The overhead register preferably faces the interior of the car in such position that it may readily be observed by the passengers within the car the conductor or collector being stationed at such a point as to be ready to receive the paper transfers from incoming passengers and to watch the deposit of coins or tokens in the hopper 17. The conductor is also required to operate the crank 109 to ring up fares on the overhead register 1. At this time the handle 78 of the combination setting mechanism is in such position that the combination wheels 61 to 64 have been set and the door 44 opened so that the coins after being dumped from the trap doors 21, 22, pass down into the coin pan 105 and may be rung up as fast as deposited.

When a zone point is reached the conductor operates the combination setting handle 77 such that the door is closed and the interlocks released and withdraws the hopper receptacle 14, taking it to the front of the car and securing the deposit of a fare from each passenger then in the car, regardless of whether the passenger has just boarded the car or has remained in the car from the last zone.

After the fares have all been collected in the hopper receptacle 14, this hopper receptacle is placed back in its socket and the combination setting mechanism is operated by means of the crank 77 until the trap door 44 is opened. This is at the point of movement indicated at $f$ in the diagram of Fig. 4. At this time the interlocking pawl 116 has been drawn back to the first thread 121, the overhead register cannot be reset and the lever 128 which locks the projection 125 has been cast into place and at the same time the hook 140 lies over the projection 141 and the bolt 143 projects into the opening 145 so that the hopper receptacle cannot be withdrawn. The coins are then rung up by operating the crank 109 and after five clear turns of the shaft 111 have been made, the interlocking arm 128 is released. The combination setting mechanism is then operated if it is desired to free the hopper receptacle or, if the hopper receptacle is to remain, no operation of the combination setting mechanism is required, the door 44 being left open and the hopper receptacle locked into its socket.

The overhead register can be reset only after the interlocking pawl 116 has been moved to its outermost position by five free turns of the shaft 111. As above explained the position of this pawl 116 is controlled by the coin counting mechanism and by the cam 131 on the combination setting mechanism. The combination setting mechanism is so turned with respect to the cam 131 that the operation of the pawl 116 occurs in the early part of the cycle of movement of the combination setting mechanism.

The possibility of the combination of any particular lock being discovered is very remote, not only because of the ratio of the gears 49 and 68 but also because of the difficulty and because of the small hold afforded by the shaft 50 for transmitting motion to the combination wheels. The possibility of the combination being discovered from the clutch member 100 is very remote because of the inner and hidden position of the clutch-member and the inability to observe it directly.

In the event that the combination of a particular machine should be discovered as might be caused by breakage of the parts or the like, the machine may readily be set to a different combination as above explained. The combination wheels 61 to 64 are each provided with ten possible setting points and for this apparatus ten thousand different combinations are possible.

While I have described my invention with reference to the details of a particular embodiment, it is to be understood that the invention is capable of being embodied in a variety of forms and is not limited to the details, dimensions nor proportions that I have shown. I believe that the combination of a combination lock with combination setting mechanism to be operated by a simple manual movement is broadly new. I believe also that the combination of a coin counting and registering mechanism with a removable hopper of the type which I have shown is broadly new and that I am the first to provide the various interlocking relations and functions above described. I am aware that locked boxes are broadly speaking old, by my invention goes far beyond this. The use of my mechanism in handling zone traffic is broadly new and forms a marked improvement in the art.

What I claim is:

1. A hopper adapted to receive coins directly from the patrons, closing means therefor, a combination lock controlling said closing means, said lock comprising a plurality of combination wheels, interengaging pins on said wheels, said wheels being adapted to be set by alternate backward and forward motion of the last wheel, a cam-shaft and means controlled by rotation of the cam-shaft in one direction only for imparting the necessary backward and forward motion to the last combination wheel to set up the combination for releasing said closing means.

2. A hopper adapted to receive coins directly from the patrons, closing means therefor, a combination lock governing said closing means, said lock comprising a plurality of combination wheels, said wheels having interengaging pins for setting said wheels, said pins being adjustable to change the combination and means operated invariably in the same manner for setting up the combination regardless of the setting of said pins.

3. In combination, a hopper adapted to receive fares directly from the patrons, a door for said hopper, a combination lock for said door, said lock being secured to said hopper and combination setting means adapted to be brought into engagement with said combination lock, said setting means having mutatable means adapted to be set in conformity with the combination wheels of the lock, said setting means being adapted to be operated by a uniform motion regardless of the setting of the wheels and of the mutatable element.

4. A hopper-receptacle comprising a hopper top for receiving tokens directly from the patrons, an inspection door and a receptacle below said inspection door, a discharge opening, door means for closing said discharge opening, and a combination lock governing said door means, said lock being inclosed and a shaft geared to said combination lock.

5. In a hopper-receptacle, a hopper top adapted to receive tokens directly from the patrons, an inclosing casing having a transparent portion, an inspection door at the bottom of said transparent portion, a chamber below said inspection door, a discharge opening for said chamber, a door normally closing off said chamber, a combination-lock controlling said door, a shaft geared to one of the combination wheels of said lock, a clutch element projecting from said shaft, and a casing inclosing said lock and said shaft.

In witness whereof I hereunto subscribe my name this 30th day of January, A. D. 1917.

ARTHUR H. WOODWARD.